United States Patent
Yoon et al.

(10) Patent No.: US 10,087,893 B2
(45) Date of Patent: Oct. 2, 2018

(54) WATER-COOLED EGR COOLER

(71) Applicant: Hyundai Motor Company, Seoul (KR)

(72) Inventors: Sung Il Yoon, Seoul (KR); Dong Young Lee, Goyang-si (KR); Seogjin Yoon, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/371,926

(22) Filed: Dec. 7, 2016

(65) Prior Publication Data
US 2018/0073469 A1    Mar. 15, 2018

(30) Foreign Application Priority Data
Sep. 9, 2016    (KR) .................. 10-2016-0116723

(51) Int. Cl.
| | |
|---|---|
| *F02M 26/25* | (2016.01) |
| *F28F 27/02* | (2006.01) |
| *F02M 26/28* | (2016.01) |
| *F02M 26/32* | (2016.01) |
| *F28F 3/00* | (2006.01) |

(Continued)

(52) U.S. Cl.
CPC ............ *F02M 26/25* (2016.02); *F02M 26/28* (2016.02); *F02M 26/32* (2016.02); *F28F 3/00* (2013.01); *F28F 9/001* (2013.01); *F28F 9/0224* (2013.01); *F28F 21/084* (2013.01); *F28F 27/02* (2013.01); *F28F 2250/06* (2013.01); *Y02T 10/16* (2013.01)

(58) Field of Classification Search
CPC ........ F02M 26/25; F02M 26/32; F02M 26/28; F02M 26/23; F02M 26/29; F02M 26/30; F02M 26/21; F28F 21/084; F28F 3/00; F28F 9/0224; F28F 9/001; F28F 27/02; F28F 2250/06
USPC .................................................. 165/103, 297
See application file for complete search history.

(56) References Cited

U.S. PATENT DOCUMENTS

| | | | | |
|---|---|---|---|---|
| 2004/0206342 | A1 * | 10/2004 | Moyer ................... | F02M 26/25 |
| | | | | 123/568.12 |
| 2005/0199381 | A1 * | 9/2005 | Mercz ..................... | F16K 1/222 |
| | | | | 165/172 |

(Continued)

FOREIGN PATENT DOCUMENTS

| | | | | |
|---|---|---|---|---|
| JP | 2006299942 A | * | 11/2006 | ............. F02M 26/25 |
| JP | 2009036063 A | | 2/2009 | |

(Continued)

*Primary Examiner* — Lindsay Low
*Assistant Examiner* — George Jin
(74) *Attorney, Agent, or Firm* — Slater Matsil, LLP

(57) ABSTRACT

A water-cooled EGR cooler is to be supplied with exhaust gas from an exhaust line and is to re-circulate the cooled exhaust gas to an intake line. A housing has an exhaust inlet, an exhaust outlet, a coolant inlet, and a coolant outlet. A heat exchange member is disposed in the housing and includes exhaust gas passages from the exhaust inlet to the exhaust outlet at a predetermined interval and also includes a coolant passage through which coolant can flow from the coolant inlet to the coolant outlet between the exhaust gas passages. A pipe member includes a bypass passage formed between an upper surface of the heat exchange member and an inside upper surface of the housing to allow the exhaust gas to bypass the heat exchange member and flow between the upper surface of the heat exchange member and the coolant outlet.

19 Claims, 3 Drawing Sheets

(51) Int. Cl.
*F28F 9/00* (2006.01)
*F28F 9/02* (2006.01)
*F28F 21/08* (2006.01)

(56) References Cited

U.S. PATENT DOCUMENTS

| | | | | |
|---|---|---|---|---|
| 2006/0090880 A1* | 5/2006 | Sugihara | ............... | F28D 7/16 |
| | | | | 165/103 |
| 2006/0124114 A1* | 6/2006 | Sayers | ............... | F02M 26/26 |
| | | | | 123/568.12 |
| 2006/0278204 A1* | 12/2006 | Hatano | ............... | F02M 26/49 |
| | | | | 123/568.12 |
| 2007/0017489 A1* | 1/2007 | Kuroki | ............... | F02M 26/25 |
| | | | | 123/568.12 |
| 2009/0249782 A1* | 10/2009 | Li | ............... | F02M 26/25 |
| | | | | 60/599 |
| 2010/0307231 A1* | 12/2010 | Allard | ............... | F02M 26/49 |
| | | | | 73/114.74 |
| 2011/0023839 A1* | 2/2011 | Styles | ............... | F02M 26/25 |
| | | | | 123/568.12 |
| 2011/0185991 A1* | 8/2011 | Sheidler | ............... | F02B 29/0418 |
| | | | | 123/41.09 |
| 2013/0042842 A1* | 2/2013 | Vassallo | ............... | F01P 3/20 |
| | | | | 123/568.12 |
| 2013/0074814 A1* | 3/2013 | Schatz | ............... | F28F 3/025 |
| | | | | 123/568.12 |
| 2014/0041643 A1* | 2/2014 | Han | ............... | F02B 47/08 |
| | | | | 123/568.12 |
| 2015/0040875 A1* | 2/2015 | Han | ............... | F01M 5/001 |
| | | | | 123/568.12 |

FOREIGN PATENT DOCUMENTS

KR       1020140000406 A      1/2014
KR       101637981 B1      7/2016

\* cited by examiner

WATER-COOLED EGR COOLER

CROSS-REFERENCE TO RELATED APPLICATIONS

This application claims priority to and the benefit of Korean Patent Application No. 10-2016-0116723 filed in the Korean Intellectual Property Office on Sep. 9, 2016, the entire contents of which are incorporated herein by reference.

TECHNICAL FIELD

The present invention relates to a water-cooled EGR cooler capable of cooling exhaust gas re-circulated from an exhaust line to an intake line with a coolant.

BACKGROUND

In recent years, as environmental problems such as global warming emerge, regulations for exhaust gas have been tightened, in particular, emissions of exhaust gas of a vehicle have been strictly controlled.

In detailer, according to EURO-6, in the case of a diesel engine for a car, emissions of NOx need to be reduced to about 80 mg/km. In response, automobile industries have used new technologies such as exhaust gas recirculation (EGR), LNT, and SCR.

The EGR apparatus may include a high pressure exhaust gas recirculation (HP-EGR) apparatus that re-circulates exhaust gas and mixes the re-circulated exhaust gas with compressed air and a low pressure exhaust gas recirculation (LP-EGR) apparatus that re-circulates exhaust gas of a back end of a diesel particle filter (DPF) and mixes the re-circulated exhaust gas with air at a front end of a turbo-charger.

In this case, to cool the re-circulated exhaust gas, an exhaust gas recirculation line is provided with an EGR cooler that is made of a stainless material having a high corrode resistance against a high temperature state and condensed water.

By the way, the EGR cooler made of the stainless material is heavy, has low heat transfer efficiency and poor moldability, and is expensive in the overall cost of parts. Therefore, researches for an EGR cooler made of an aluminum material that has high heat transfer efficiency and good moldability and is relatively inexpensive in the cost of part have been conducted.

In the EGR cooler made of an aluminum material, a heat exchange member, or the like is made of aluminum and is relatively vulnerable to heat over an SUS material and when coolant bubble is generated inside a cooler, cooling performance deteriorates, a thermal deformation occurs, and a coolant is leaked to damage an engine.

FIG. 3 is a perspective view of a typical water-cooled EGR cooler.

Referring to FIG. 3, an inlet and an outlet of a lower portion of the EGR cooler 100 are each provided with a coolant supply pipe 104 and a coolant exhaust pipe 115 and an inlet cone part is provided with a bypass valve 400. Further, an actuator 405 that actuates the bypass valve 400 is disposed.

In this configuration, the coolant is supplied to one side of the lower portion and discharged to the other side of the lower portion, such that bubbles formed due to a boiling of the coolant may not be smoothly discharged.

The above information disclosed in this Background section is only for enhancement of understanding of the background of the invention and therefore it may contain information that does not form the prior art that is already known in this field to a person of ordinary skill in the art.

The document Korean Patent Laid-Open Publication No. 10/2014/0000406 discloses subject matter that is related to subject matter described herein.

SUMMARY

The present invention has been made in an effort to provide a water-cooled EGR cooler having advantages of easily discharging bubbles generated from coolant while cooling exhaust gas to stably maintain cooling performance and reducing a leak due to thermal deformation to prevent a fail of an engine.

An exemplary embodiment of the present invention provides a water-cooled EGR cooler supplied with exhaust gas from an exhaust line and re-circulating the cooled exhaust gas to an intake line. The water-cooled EGR cooler includes a housing configured to have both ends each provided with an inlet and an outlet through which the exhaust gas are in and out. An inlet of a lower portion is provided with a coolant inlet, and an outlet of an upper portion is provided with a coolant outlet. A heat exchange member is configured to be disposed in the housing, to be provided with exhaust gas passages from the inlet to the outlet at a predetermined interval, and to be provided with a coolant passage through which coolant flows from the inlet of the lower portion to the outlet of the upper portion between the exhaust gas passages. A pipe member is configured to be provided with a bypass passage formed between an upper surface of the heat exchange member and an inside upper surface of the housing to allow the exhaust gas to bypass the heat exchange member and to connect between the upper surface of the heat exchange member and the coolant outlet in the bypass passage.

The water-cooled EGR cooler may further include a lower board configured to be disposed on an upper surface of the heat exchange member; and an upper board configured to be disposed on the inside upper surface of the housing, in which the bypass passage may be formed between the lower board and the lower board.

A lower portion of an outer circumferential surface of the pipe member may be brazed to an inner circumferential surface of a portion bent upwardly from the lower board.

An upper portion of an outer circumferential surface of the pipe member may be brazed to an inner circumferential surface of a portion bent downwardly from the upper board.

An upper gap may be formed between an upper surface of the upper board and an inner surface of the housing along a circumference of the pipe member.

The upper gap may be gradually widened toward a central portion of the pipe member.

The upper gap may be formed by bending the housing upward.

A lower gap may be formed between a lower surface of the lower board and an upper surface of the heat exchange member along the circumference of the pipe member.

The lower gap may be gradually widened toward the central portion of the pipe member.

The lower gap may be formed by bending the lower board toward the upper portion of the housing.

The heat exchange member, the upper board, and the lower board may be made of an aluminum material.

The upper board and the lower board may be formed by bending one board.

The water-cooled EGR cooler may further include: a bypass valve configured to open and close an inlet of the bypass passage and an actuator configured to actuate the bypass valve.

The water-cooled EGR cooler may further include: a coolant supply pipe configured to be connected to the coolant inlet; and a coolant exhaust pipe configured to be connected to the coolant outlet.

According to the exemplary embodiment of the present invention, it is possible to stably remove the bubbles generated from the coolant by being supplied with the coolant from the lower portion of the inlet of the EGR cooler and discharging the coolant to the upper portion of the outlet.

Accordingly, it is possible to stably maintain the performance of the EGR cooler, reduce the thermal deformation, and effectively prevent the fail of the engine.

Figure 1:
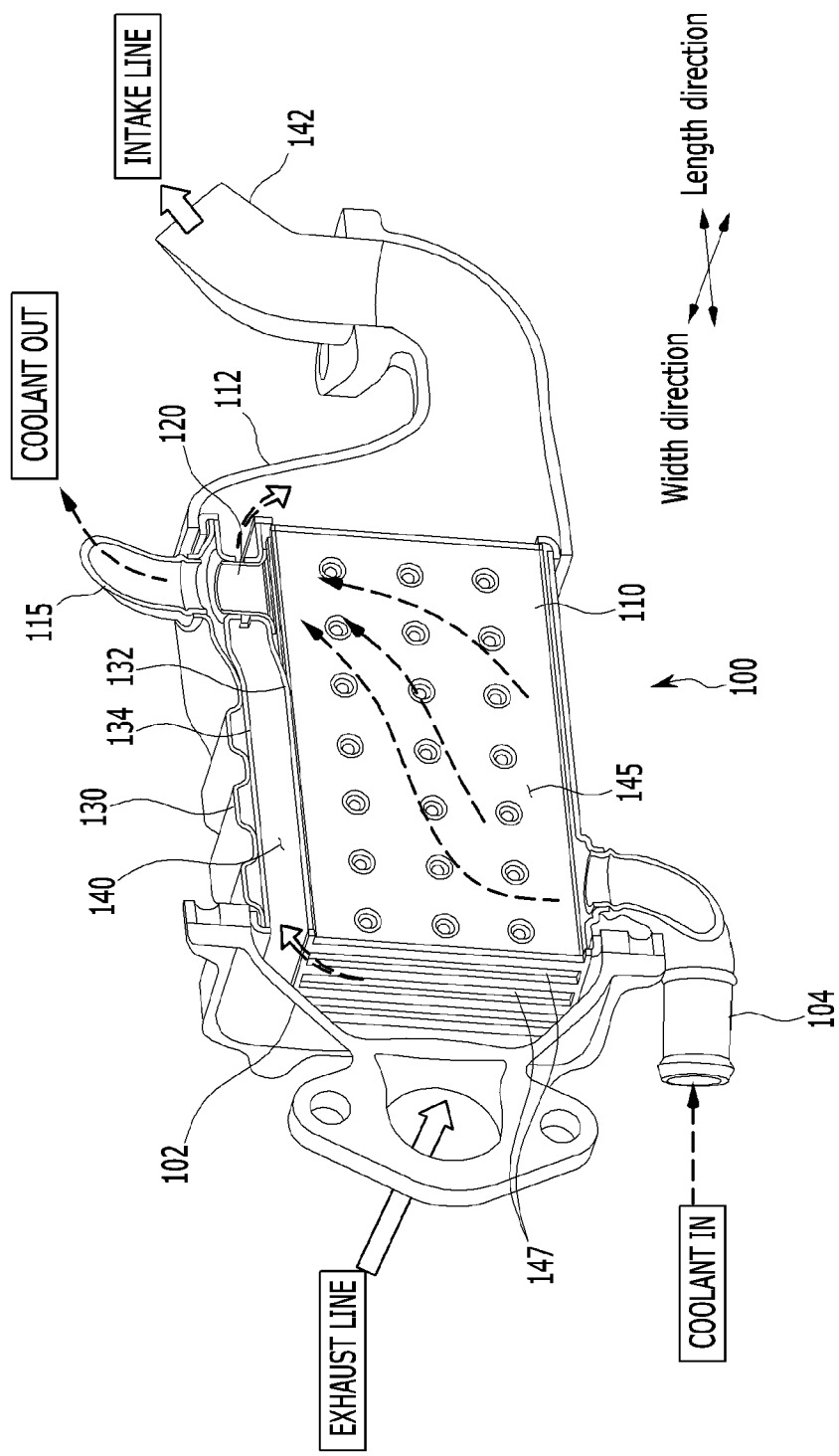
FIG. 1 is a cross-sectional view of an EGR cooler according to the exemplary embodiment of the present invention.

The following reference symbols can be used in conjunction with the drawings:

| | |
|---|---|
| 100: EGR cooler | 102: Inlet cone part |
| 104: Coolant supply pipe | 110: Heat exchange member |
| 112: Outlet cone part | 115: Coolant exhaust pipe |
| 120: Pipe member | 130: Housing |
| 132: Lower board | 134: Upper board |
| 142: Connection pipe | 140: Bypass passage |
| 145: Coolant passage | 147: Exhaust gas passage |
| 300: Upper gap | 305: Lower gap |
| 310: Brazing connection part | |

DETAILED DESCRIPTION OF ILLUSTRATIVE EMBODIMENTS

Hereinafter, an exemplary embodiment of the present invention will be described in detail with reference to the accompanying drawings.

However, since sizes and thicknesses of the respective components were arbitrarily shown in the accompanying drawings for convenience of explanation, the present invention is not necessarily limited to contents shown in the accompanying drawings. In addition, thicknesses were exaggerated in order to obviously represent several portions and regions.

However, contents that are not associated with a description will be omitted in order to clearly describe an exemplary embodiment of the present invention, and components that are the same as or are similar to each other will be denoted by the same reference numerals throughout the present specification.

In the following description, the same components are classified into first, second, and the like to differentiate names for components and a sequence thereof is not necessarily limited thereto.

FIG. 1 is a cross-sectional view of an EGR cooler 100 according to the exemplary embodiment of the present invention. Although referred to as a water-cooled EGR cooler, it is understood that any fluid coolant can be used in the EGR cooler 100.

Referring to FIG. 1, an EGR cooler 100 includes an inlet cone part 102, a coolant supply pipe 104, a coolant passage 145, a heat exchange member 110, an outlet cone part 112, a connection pipe 142, a coolant exhaust pipe 115, a pipe member 120, a lower board 132, an upper board 134, a housing 130, and a bypass passage 140.

An inlet of the housing 130 is provided with the inlet cone part 102, an outlet thereof is provided with the outlet cone part 112, the inlet cone part 102 is supplied with exhaust gas from an exhaust line, and the outlet cone part 112 supplies the exhaust gas to an intake line through the connection pipe 142.

In this configuration, the connection pipe is inserted into the intake line to smoothly re-circulate the exhaust gas.

An inside of the housing 130 is provided with the heat exchange member 110 and exhaust gas passages 147 are formed from the inlet of the heat exchange member 110 to the outlet thereof.

Here, the exhaust gas passages 147 are formed in a tube (no reference numeral) and the exhaust gas passages 147 are arranged in a width direction at a predetermined interval. Further, the coolant passage 145 through which a coolant flows is formed between the exhaust gas passages 147 and the coolant passage 145 is formed at a predetermined interval in the width direction in which the exhaust gas passages 147 are arranged.

An inlet of a lower surface of the housing 130 is connected to the coolant supply pipe 104 and an outlet of an upper surface thereof is connected to the coolant exhaust pipe 115. The coolant supply pipe 104 is supplied with a coolant and the coolant exhaust pipe 115 discharges the coolant.

The coolant supplied through the coolant supply pipe 104 cools the exhaust gas passing through the exhaust gas passage 147 using the heat exchange member 110, while passing through the coolant passage 145 and is circulated through the coolant exhaust pipe 115.

The bypass passage 140 is formed between the upper surface of the heat exchange member 110 and an inside upper surface of the housing 130. The bypass passage 140 is formed between the lower board 132 and the upper board 134. Here, the lower board 132 and the upper board 134 may be manufactured in a pipe form by bending one board.

According to the exemplary embodiment of the present invention, the pipe member 120 is formed to penetrate through the bypass passage 140 between a space in which the heat exchange member 110 is disposed and the coolant exhaust pipe 115. Here, the pipe member 120 transfers the coolant passing through the coolant passage 145 of the heat exchange member 110 to the coolant exhaust pipe 115.

According to the exemplary embodiment of the present invention, the coolant is supplied to a lower inlet and discharged to an upper outlet to easily discharge bubbles generated due to a boiling of the coolant, thereby solving a problem of a thermal deformation and a leak of the cooler.

Further, the pipe member 120 is disposed to penetrate through the bypass passage 140 disposed at the upper portion, and thus the coolant may move downwardly from above.

Figure 3:
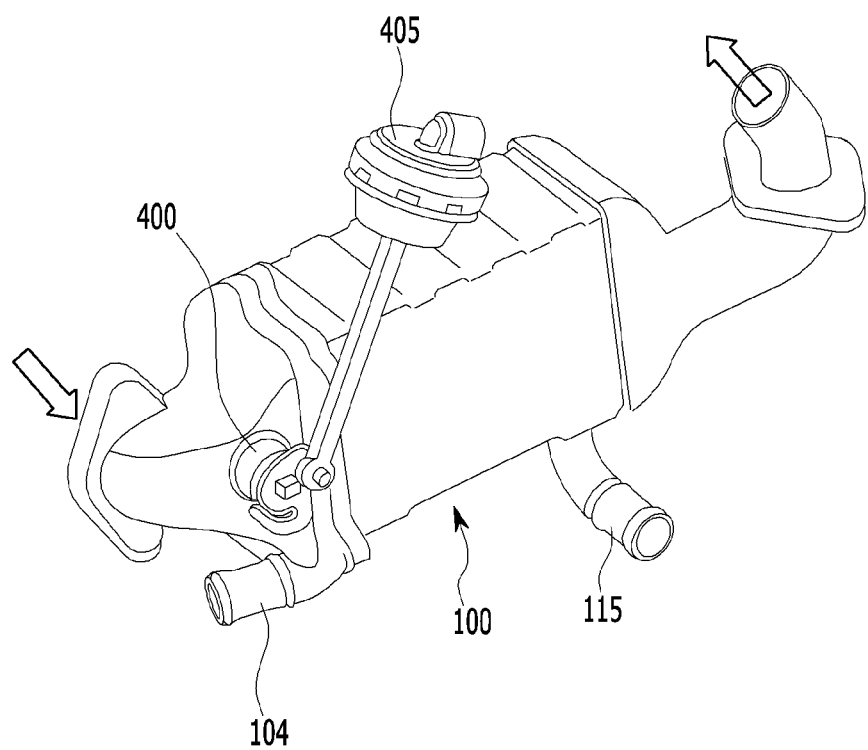
FIG. 3 is a perspective view of a typical EGR cooler.

The inlet cone part 102 is provided with the bypass valve 400 (FIG. 3) and an actuator 405 (FIG. 3) actuating the bypass valve 400 and the bypass valve controls a path of exhaust gas to allow the exhaust gas to pass through the bypass passage 140 or the exhaust gas passage 147. According to the exemplary embodiment of the present invention, a structure of the bypass valve 400 (FIG. 3) refers to the known technology and therefore the description thereof will be omitted.

Figure 2:
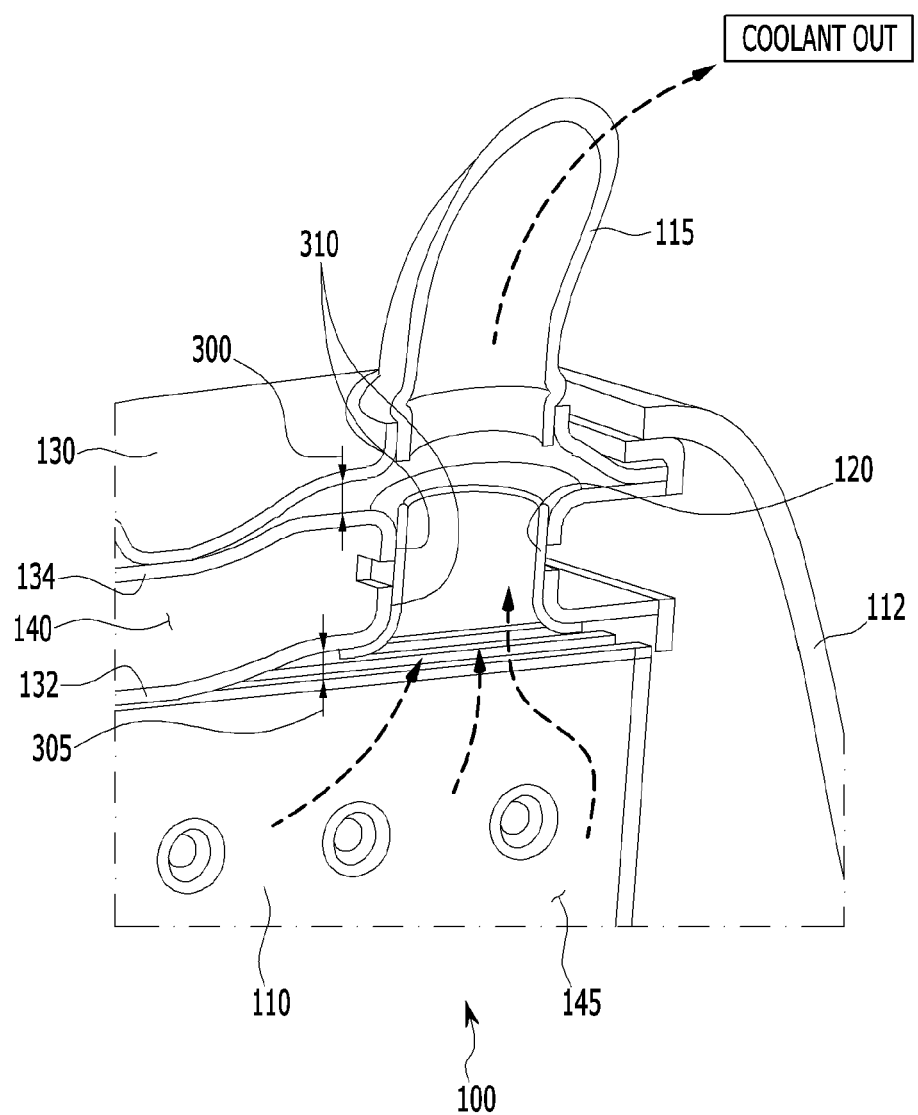
FIG. 2 is a partially detailed cross-sectional view of the EGR cooler according to the exemplary embodiment of the present invention.

FIG. 2 is a partially detailed cross-sectional view of the EGR cooler according to the exemplary embodiment of the present invention.

Referring to FIG. 2, an outer circumferential surface of an upper end portion of the pipe member 120 is brazed to an outer side of the upper board 134 along a circumference and an outer circumferential surface of a lower end portion of the pipe member 120 is brazed to an outer side of the lower board 132 along a circumference, thereby forming a brazing connection part 310.

As described above, the pipe member 120 transfers the coolant passing through the coolant passage 145 to the coolant exhaust pipe 115.

A lower gap 305 is formed between the lower board 132 and an upper surface of the heat exchange member 110 along the circumference of the pipe member 120. The lower gap 305 includes a portion that gradually rises toward a center of the pipe member 120. Here, the lower gap 305 may be formed by bending the lower board 132 upward.

Further, an upper gap 300 is formed between the upper board 134 and the inside upper surface of the housing 130 along the circumference of the pipe member 120. The upper gap 300 includes a portion that gradually rises toward a center of the pipe member 120. Here, the upper gap 300 may be formed by bending the housing 130 upward.

According to the exemplary embodiment of the present invention, the lower gap 305 smoothly moves the coolant, collects bubbles to the central portion of the pipe member 120, and provides a space in which the pipe member 120 and the lower board 132 are bonded.

Further, the upper gap 300 smoothly moves the coolant, discharges bubbles to the central portion of the coolant exhaust pipe 115, and provides a space in which the coolant exhaust pipe 115 and the upper board 134 are bonded According to the exemplary embodiment of the present invention, the heat exchange member may have a tube and a pin structure, and the structure thereof refers to the known technology and therefore the detailed description thereof will be omitted.

Further, the heat exchange member, the upper board, the lower board, and the pipe member may be made of an aluminum material.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

What is claimed is:

1. A water-cooled EGR (exhaust gas recirculation) cooler to be supplied with an exhaust gas from an exhaust line and to re-circulate the exhaust gas after it is cooled to an intake line, the water-cooled EGR cooler comprising:
 a housing having an exhaust inlet at a first end and an exhaust outlet at an opposite second end through which the exhaust gas can pass in and out of the housing, a lower portion of the first end of the housing provided with a coolant inlet and an upper portion of the second end of the housing provided with a coolant outlet;
 a heat exchange member disposed in the housing, the heat exchange member including exhaust gas passages from the exhaust inlet to the exhaust outlet at a predetermined interval, and also including a coolant passage through which coolant can flow from the coolant inlet to the coolant outlet between the exhaust gas passages;
 a pipe member that includes a bypass passage formed between an upper surface of the heat exchange member and an inside upper surface of the housing to allow the exhaust gas to bypass the heat exchange member and flow between the upper surface of the heat exchange member and the coolant outlet;
 a lower board disposed on the upper surface of the heat exchange member; and
 an upper board disposed on the inside upper surface of the housing, wherein the bypass passage is formed between the lower board and the upper board.

2. The water-cooled EGR cooler of claim 1, wherein a lower portion of an outer circumferential surface of the pipe member is brazed to an inner circumferential surface of a portion bent upwardly from the lower board.

3. The water-cooled EGR cooler of claim 1, wherein an upper portion of an outer circumferential surface of the pipe member is brazed to an inner circumferential surface of a portion bent downwardly from the upper board.

4. The water-cooled EGR cooler of claim 3, wherein an upper gap is formed between an upper surface of the upper board and an inner surface of the housing along a circumference of the pipe member.

5. The water-cooled EGR cooler of claim 4, wherein the upper gap gradually widens toward a central portion of the pipe member.

6. The water-cooled EGR cooler of claim 4, wherein the upper gap is formed by bending the housing upward.

7. The water-cooled EGR cooler of claim 3, wherein a lower gap is formed between a lower surface of the lower board and the upper surface of the heat exchange member along a circumference of the pipe member.

8. The water-cooled EGR cooler of claim 7, wherein the lower gap gradually widens toward a central portion of the pipe member.

9. The water-cooled EGR cooler of claim 7, wherein the lower gap is formed by bending the lower board toward the upper portion of the housing.

10. The water-cooled EGR cooler of claim 1, wherein the heat exchange member, the upper board, and the lower board are made of an aluminum material.

11. The water-cooled EGR cooler of claim 1, wherein the upper board and the lower board comprise a single bent board.

12. The water-cooled EGR cooler of claim 1, further comprising:
 a bypass valve configured to open and close an inlet of the bypass passage; and
 an actuator configured to actuate the bypass valve.

13. The water-cooled EGR cooler of claim 1, further comprising:
 a coolant supply pipe connected to the coolant inlet; and
 a coolant exhaust pipe connected to the coolant outlet.

14. A water-cooled EGR (exhaust gas recirculation) cooler to be supplied with an exhaust gas from an exhaust line and to re-circulate cooled exhaust gas to an intake line, the water-cooled EGR cooler comprising:
 a housing having an exhaust inlet at a first end and an exhaust outlet at an opposite second end through which the exhaust gas can pass in and out of the housing, a lower portion of the first end of the housing provided with a coolant inlet and an upper portion of the second end of the housing provided with a coolant outlet;

a heat exchange member disposed in the housing, the heat exchange member including exhaust gas passages from the exhaust inlet to the exhaust outlet at a predetermined interval, and also including a coolant passage through which coolant can flow from the coolant inlet to the coolant outlet between the exhaust gas passages;

a lower board disposed on an upper surface of the heat exchange member;

an upper board disposed on an inside upper surface of the housing;

a bypass passage formed between the lower board and the upper board to allow the exhaust gas to bypass the heat exchange member and flow between the upper surface of the heat exchange member and the coolant outlet;

a bypass valve configured to open and close an inlet of the bypass passage; and an actuator configured to actuate the bypass valve.

15. The water-cooled EGR cooler of claim 14, further comprising a pipe member, the bypass passage being disposed in the pipe member.

16. The water-cooled EGR cooler of claim 15, wherein a lower portion of an outer circumferential surface of the pipe member is brazed to an inner circumferential surface of a portion bent upwardly from the lower board; and wherein an upper portion of an outer circumferential surface of the pipe member is brazed to an inner circumferential surface of a portion bent downwardly from the upper board.

17. The water-cooled EGR cooler of claim 15, wherein an upper gap is formed between an upper surface of the upper board and an inner surface of the housing along a circumference of the pipe member, the upper gap gradually widening toward a central portion of the pipe member; and wherein a lower gap is formed between a lower surface of the lower board and the upper surface of the heat exchange member along a circumference of the pipe member, the lower gap gradually widening toward a central portion of the pipe member.

18. The water-cooled EGR cooler of claim 14, further comprising:

a coolant supply pipe connected to the coolant inlet; and a coolant exhaust pipe connected to the coolant outlet.

19. The water-cooled EGR cooler of claim 14, wherein the upper board and the lower board comprise a single bent board.

* * * * *